June 24, 1958 E. C. PETERSON 2,839,956
AUXILIARY MANIPULATOR
Filed Aug. 23, 1954 8 Sheets-Sheet 1

INVENTOR
EDWARD C. PETERSON
BY
ATTORNEYS

INVENTOR
EDWARD C. PETERSON
BY
ATTORNEYS

June 24, 1958 E. C. PETERSON 2,839,956
AUXILIARY MANIPULATOR
Filed Aug. 23, 1954 8 Sheets-Sheet 3

INVENTOR
EDWARD C. PETERSON
BY
ATTORNEYS

June 24, 1958 E. C. PETERSON 2,839,956

AUXILIARY MANIPULATOR

Filed Aug. 23, 1954 8 Sheets-Sheet 4

INVENTOR
EDWARD C. PETERSON
BY
ATTORNEYS

June 24, 1958 E. C. PETERSON 2,839,956

AUXILIARY MANIPULATOR

Filed Aug. 23, 1954 8 Sheets-Sheet 5

INVENTOR
EDWARD C. PETERSON
BY
ATTORNEYS

AUXILIARY MANIPULATOR

Filed Aug. 23, 1954 8 Sheets-Sheet 6

INVENTOR
EDWARD C. PETERSON
BY
ATTORNEYS

June 24, 1958 E. C. PETERSON 2,839,956

AUXILIARY MANIPULATOR

Filed Aug. 23, 1954 8 Sheets-Sheet 7

INVENTOR.
EDWARD C. PETERSON
BY [signature]
ATTORNEYS.

INVENTOR.
EDWARD C. PETERSON
BY
[signature]
ATTORNEYS.

United States Patent Office 2,839,956

Patented June 24, 1958

2,839,956

AUXILIARY MANIPULATOR

Edward C. Peterson, Reading, Pa., assignor to Birdsboro Steel Foundry and Machine Company, Birdsboro, Pa., a corporation of Delaware Application August 23, 1954, Serial No. 451,641

1 Claim. (Cl. 80—49)

The present invention relates to an auxiliary manipulator intended primarily for billets of square or diamond cross section (four sides parallel in cross section) to turn the billets about the major axis incident to rolling.

A purpose of the invention is to provide a manipulator which will turn a wide variety of squares and diamonds with minimum damage to the billets, using the same set of manipulator rolls for different cross sections of the character of diamonds and squares.

A further purpose is to turn long billet lengths from a single or a very few points of manipulator application with minimum damage to square and diamond billets.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 1:
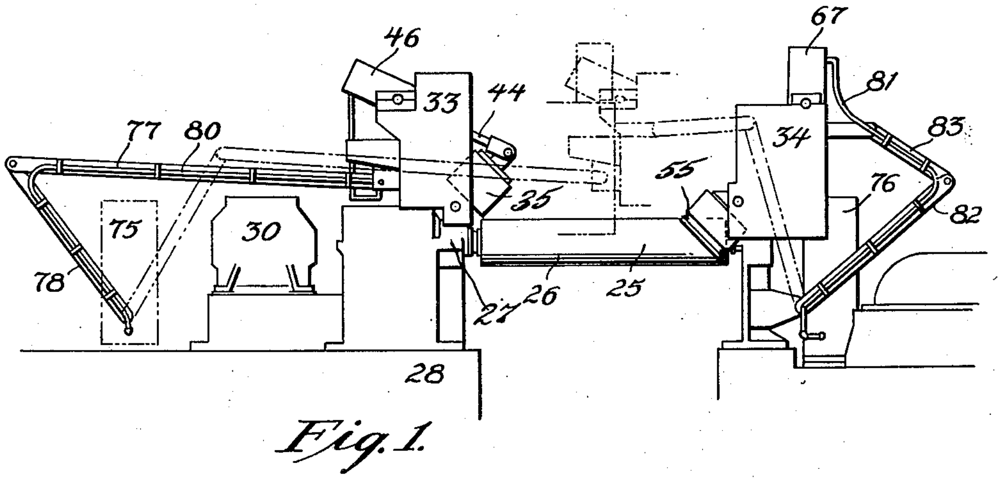
Figure 1 is a diagrammatic end elevation of an auxiliary manipulator applied to a mill table of a rolling mill.

Describing in illustration but not in limitation and referring to the drawings:

In my United States Patent No. 2,149,003, issued August 18, 1953, for Manipulating on Mill Tables, I illustrate mechanism for turning billets on a mill table, and specially directed to the turning of ovals or the like. When reference is made herein to billets it is intended to designate any character of stock which may be handled on a rolling mill of the character of a billet mill and which may therefore require turning, as well known in the process of rolling.

Difficulty has been encountered through the fact that it has not heretofore been possible to obtain an auxiliary manipulator which will turn various sizes of billets having square cross section and also various sizes of billets having diamond cross section without seriously marring the billet and without delay due to unreliable functioning of the manipulator. It has therefore in many cases been necessary to change manipulator rollers in order to turn squares on the one hand and diamonds on the other hand, and in some cases the results in turning have not been completely reliable.

In accordance with one aspect of the present invention it is possible to turn both squares and diamonds of a wide variety of sizes providing the ratio of length to cross section is not excessive, by using the same manipulator rollers, without appreciable damage to the billet, and without delay due to unreliability of the auxiliary manipulator.

Where diamonds or squares having a very great ratio of length to cross section are being manipulated, it has been found that the mechanism capable of turning both diamonds and squares cannot be used reliably. In such cases, however, by adopting special modified cross sections of the rollers, improved results are obtained in turning the billets.

The present invention is to be regarded as an improvement of the subject matter of my U. S. Patent 2,649,003 aforesaid, and many aspects which are common will therefore be mentioned only generally in the present application.

Figure 2:
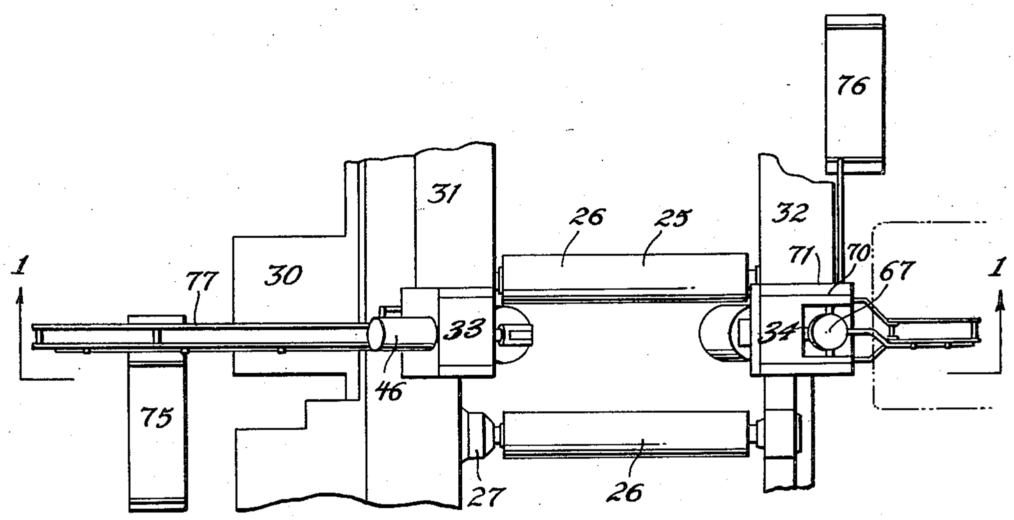
Figure 2 is a fragmentary top plan view of the structure of Figure 1.
Figure 4:
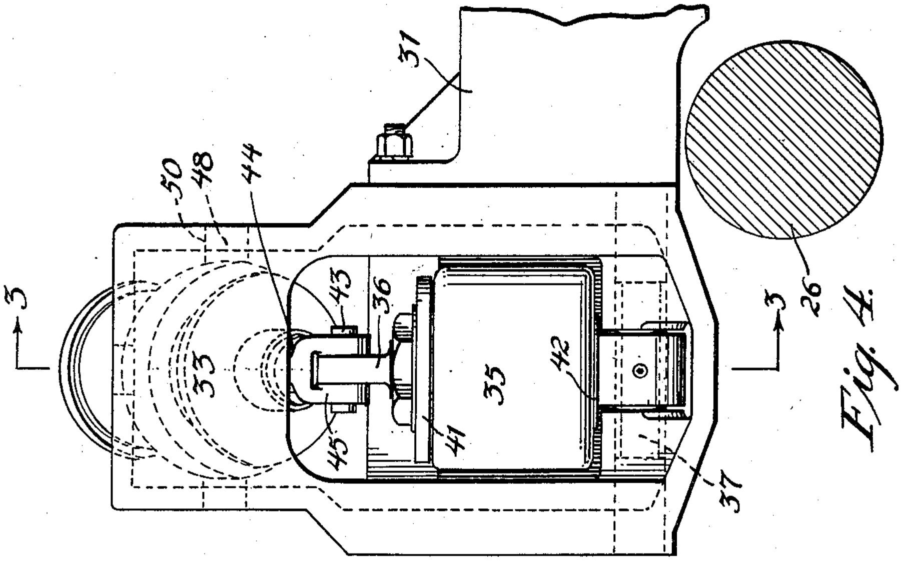
Figure 4 is a fragmentary enlarged elevation looking from between the side guards, showing the manipulator mechanism for the upper manipulator roller.
Figure 3:
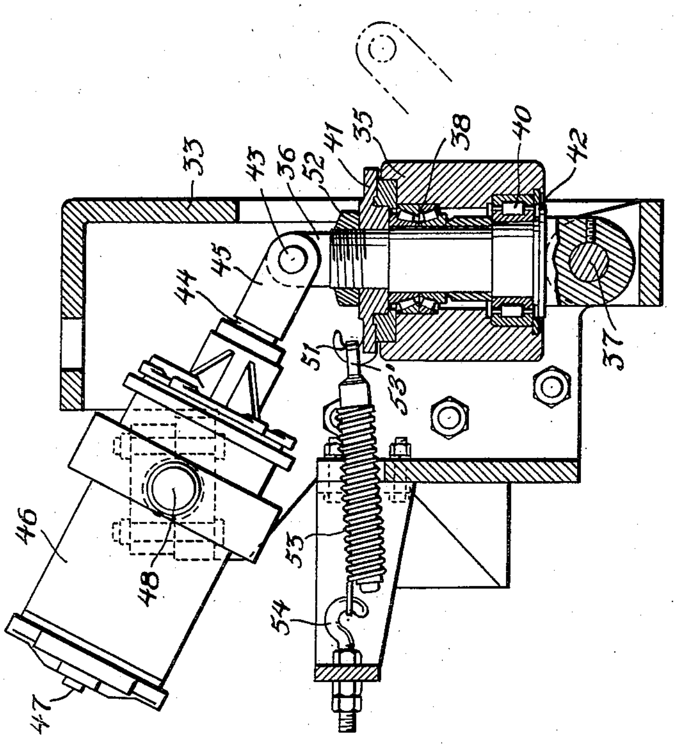
Figure 3 is an enlarged fragmentary transverse vertical section of the mechanism for the upper manipulator roller in the preferred embodiment, the section being taken on the line 3—3 of Figure 4.

Referring first to Figures 1 and 2, I illustrate a rolling mill table 25 having a plurality of horizontal table rollers 26 mounted in bearings 27 from base structure 28 and driven by suitable drive motors 30. The mill table is provided at its opposite sides with the usual laterally moving side guards 31 and 32 which are movable across the table, as well known, to carry any suitable main manipulator, as well known in the art. The guards are driven by any suitable mechanism, of which one type is described in my aforesaid patent. The guards perform the functions of laterally positioning the stock for the next pass, laterally straightening the stock, laterally confining it as it moves on the table, supporting the main manipulator, and in the present invention supporting the auxiliary manipulator. The auxiliary manipulators 33 and 34 in accordance with the present invention are mounted on the guards at a longitudinal position between two table rollers 26 so that the auxiliary manipulators at least in the case of the lower roller are able to extend below the level of the table rolls. It is preferable in accordance with the invention to accomplish the turning of the billet by auxiliary manipulators located at a single position, although auxiliary manipulators at a plurality of positions may be used.

It will be evident, of course, that the auxiliary manipulators of the present invention can, if desired, be supported in some other way than from the side guards.

The upper manipulator 33 in the preferred embodiment of Figures 1 to 7 comprises an upper manipulator roller 35, which as shown is cylindrical on its external roller surface, mounted rotatably on an arm 36 which is fixedly pivoted at 37 at its lower end on the manipulator housing attached to the side guard, on an axis running longitudinally of the side guard. The manipulator roller is journalled on the arm 36 by antifriction bearings 38 and 40, and the bearing space is sealed at the top and bottom by covers 41 and 42 which exclude dirt from the lubricant employed.

Beyond the roller 35 with respect to the pivot 37, and suitably at the upper end of the arm 36, pivotal connection 43 is made to the end of a piston and rod 44 by a clevis 45. The piston operates in cylinder 46 containing compressed air or other suitable fluid medium, which is admitted at 47. The cylinder is pivoted intermediate its ends on trunnions 48 mounted on trunnion bearings 50 on the side guard so that the cylinder is free to pivot as it operates.

Between the upper end of the roller 35 and the pivotal connection 43, the arm is provided with a spring abutment 51 on the cover 41, and the cover is suitably held by a threaded retainer 52 on the arm. The spring abutment engages one end of tension spring 53, the opposite end of which engages an adjustable spring anchorage 54 by a bracket to the side guard. The spring at one end is connected to a head 53' which extends through the spring and acts as a guard.

Figure 5:
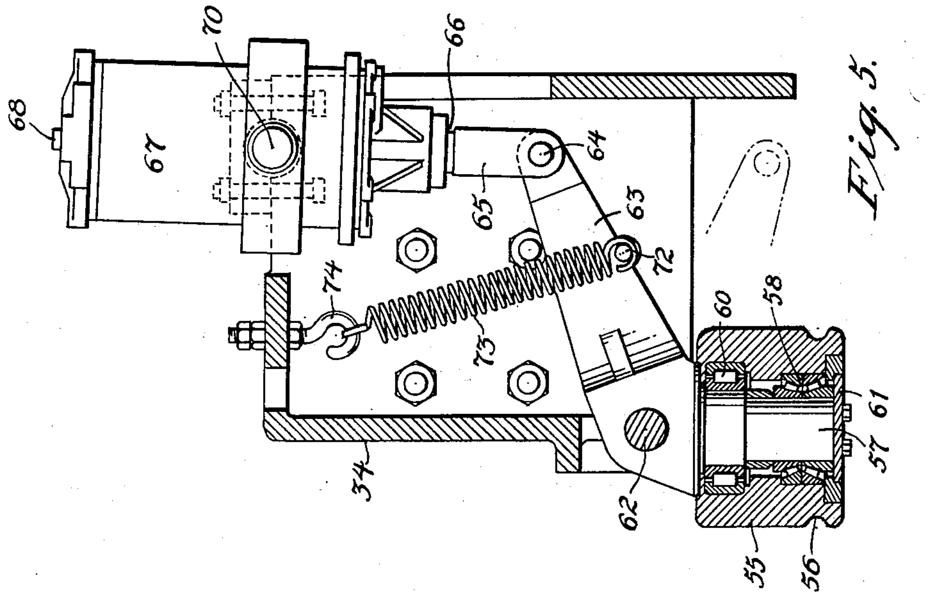
Figure 5 is a transverse vertical enlarged section of the mechanism for the lower manipulator roller in the form of Figures 1 to 4, the section being taken on the line 5—5 of Figure 6.
Figure 6:
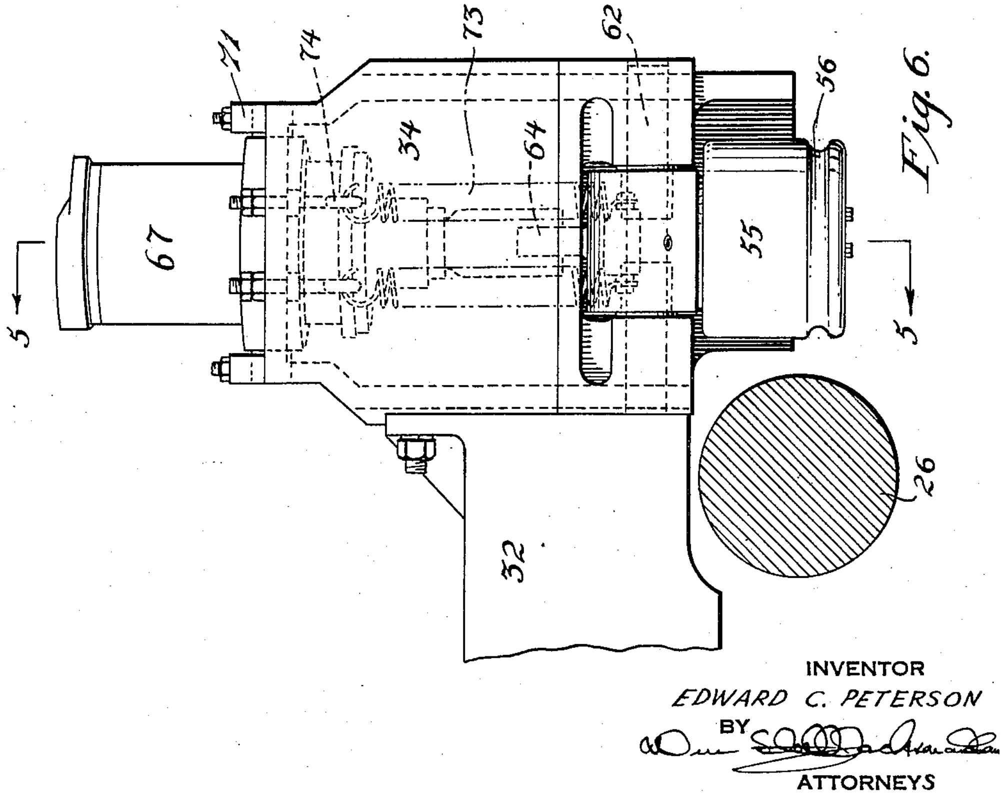
Figure 6 is an elevation of the mechanism for the lower manipulator roller of Figure 5, looking from between the side guards and showing a table roller in section.

The opposite cooperating roller which is predominantly below the billet or stock is shown at 55 (Figures 5, 6 and 7) and is predominantly cylindrical, but desirably has an annular hooking recess 56 which in inactive position as shown in Figures 5 and 6 rests below the level of the mill table rollers, but in operative position at the beginning of manipulation, the hooking recess is at about the level of the adjoining lower corner of the stock, and as the manipulator roller begins to swing in turning the stock, the hooking recess tends to assist in deflecting the adjoining corner of the billet. The hooking recess should, in accordance with the present invention, extend only across a portion of the length of the roll, desirably not more than about 20 percent of the length, and for a depth which is substantially less than the length, so that it is not a major aspect of the roll contour, but it does perform an important function in turning when it might otherwise be difficult to start this action.

The lower manipulator roller 55 is mounted on an arm 57 and is rotatable thereon, being journalled by antifriction bearings 58 and 60, held in place by retainer 61 on the bottom of the arm. The arm 57 is pivoted at 62 on the manipulator housing secured to the side guard and carries a bellcrank extension 63 at right angles whose end remote from the pivot 62 is pivotally connected at 64 to clevis 65 on the end of piston and piston rod combination 66 operating in cylinder 67 under the action of compressed air or other fluid medium admitted at 68. The cylinder is pivoted on trunnion 70 from trunnion bearings 71 on the manipulator housing.

On the bellcrank extension 63, remote from the pivot 62 are mounted spring abutments 72 which engage the ends of tension springs 73 acting from opposite spring anchorages 74 on the side guards.

Figure 15:
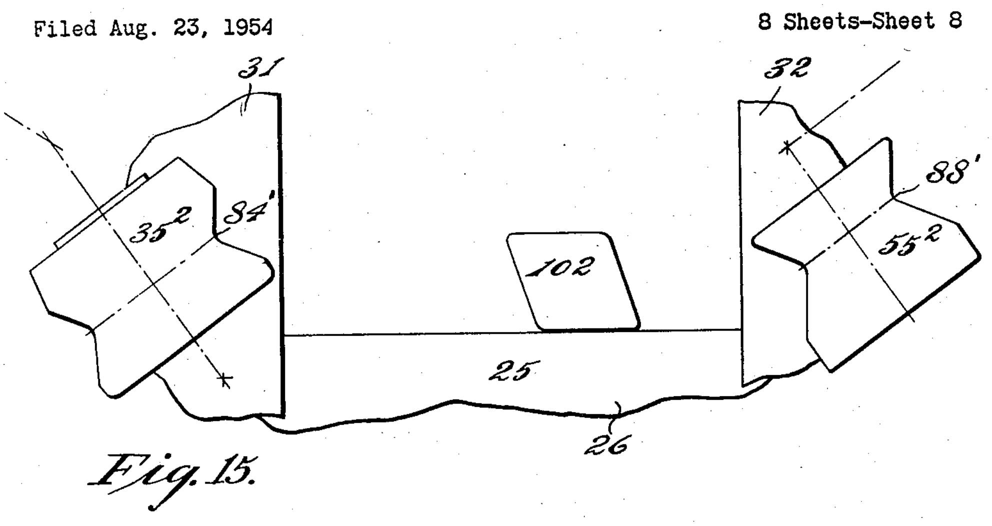
Figure 16:
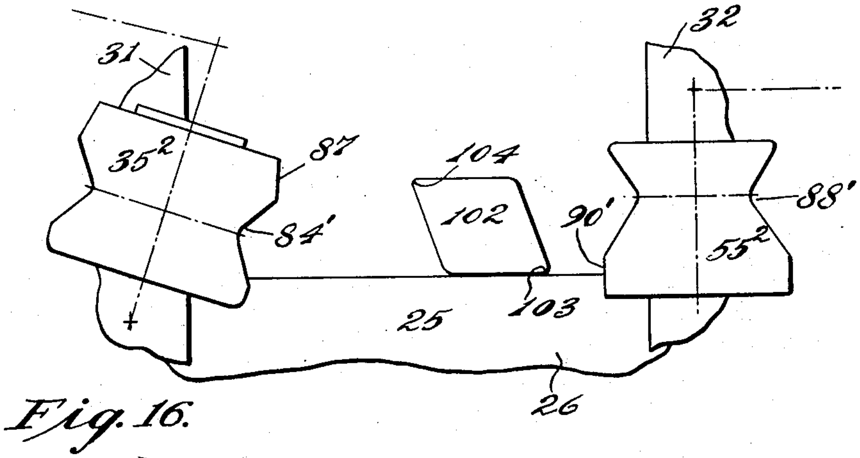

As means of providing air connections to the cylinders when the auxiliary manipulator operates, air control boxes 75 and 76 are provided, the box 75 being connected to the cylinder 46 by a flexible conduit 77 carried by suitable clips on arms 78 and 80 which are pivoted at their remote ends to the box and the manipulator and pivotally interconnected. Likewise the box 76 is connected to the cylinder 67 by flexible conduit 81 extending along arms 82 and 83 which are pivoted at their ends to the box and the manipulator and pivotally interconnected. The air control boxes may be constructed and operated as shown in Figures 15 and 16 of my aforesaid patent.

In operation it will be evident that as the square or diamond billet leaves the rolling mill and travels to the mill table over the table rollers the side guards will be rather widely spaced. As the billet reaches its limit of travel on the mill table, the side guards will normally be moved toward one another to laterally straighten the billet and move it in line with the next pass. At this time the manipulator rollers in accordance with the invention will be angularly shifted to a position behind the lines of the side guards so that the manipulator rollers do not contact the stock.

When it is desired to turn the stock, the guards are moved far enough apart so that the sides of the guards do not directly contact the stock. By applying air to the cylinders, the arms are then swung to the angular relationship shown, for example, in Figure 7, with the bottom roller in a position to be partially above and partially below the top of the mill table and to engage the side of the stock which is to become the bottom as it is turned, and the top roller above the mill table and in position to engage the side of the stock which is to become the top when the stock is turned. As the turning operation begins, if there is any difficulty encountered in beginning to rotate the stock, the engagement of the hook recess 56 on the corner of the stock adjoining the roller 55 aids in starting the turning operation without damaging the stock.

With the compressed air still applied to the cylinders, the guards are then moved progressively toward one another, and the manipulators engaging the opposite sides of the stock produce a diagonal force which has turning components. Since the air pressure maintained will apply on the piston and piston head combinations a force less than the force exerted by the side guards, the side guards will move closer and closer together while the manipulator rollers rotate the stock. Thus eventually the stock will be rotated until a diagonal thereof is substantially vertical over the mill table. This action will occur in the form of Figures 1 to 7 with both squares and diamonds, provided that there is enough leverage due to a moderately low ratio of length to cross section. In this erected position, side guards do not quite engage the stock, so that the stock can be returned to the rolling mill for the next pass by operating the table rollers which feed the stock through the manipulator rollers while the stock is held erected.

As soon as the rolling mill rolls take hold of the stock for the next pass, the operator will normally release the air pressure on the auxiliary manipulator and the springs will return the manipulator rollers to their inactive position behind the side guards.

Thus it will be evident that in the form of Figures 1 to 7 a single construction of manipulator rollers is capable of turning both diamonds and squares.

Figure 7:
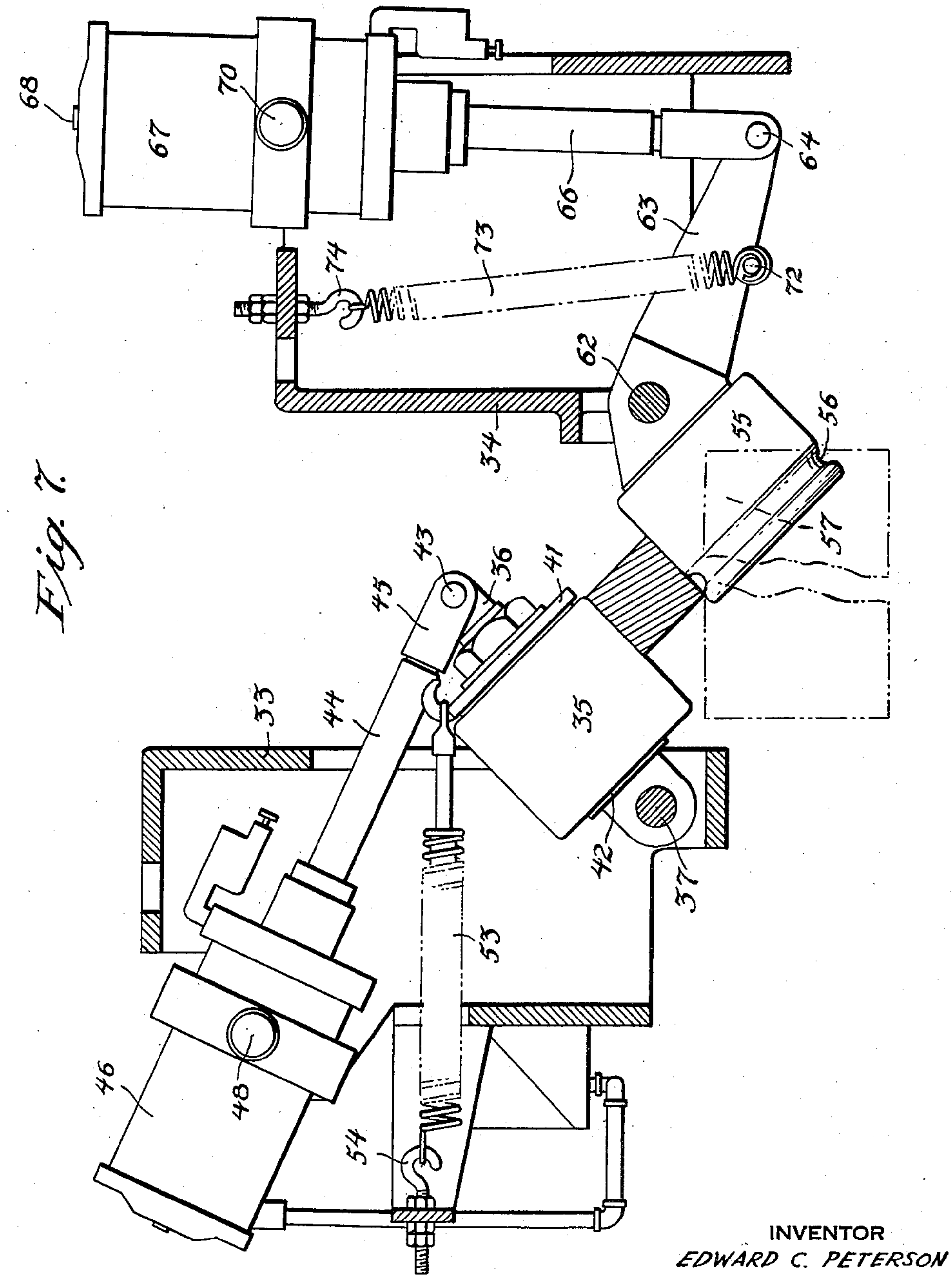
Figure 7 is a fragmentary diagrammatic view showing cooperating manipulator rollers in the process of turning a square using the mechanism of Figures 1 to 6.
Figure 8:
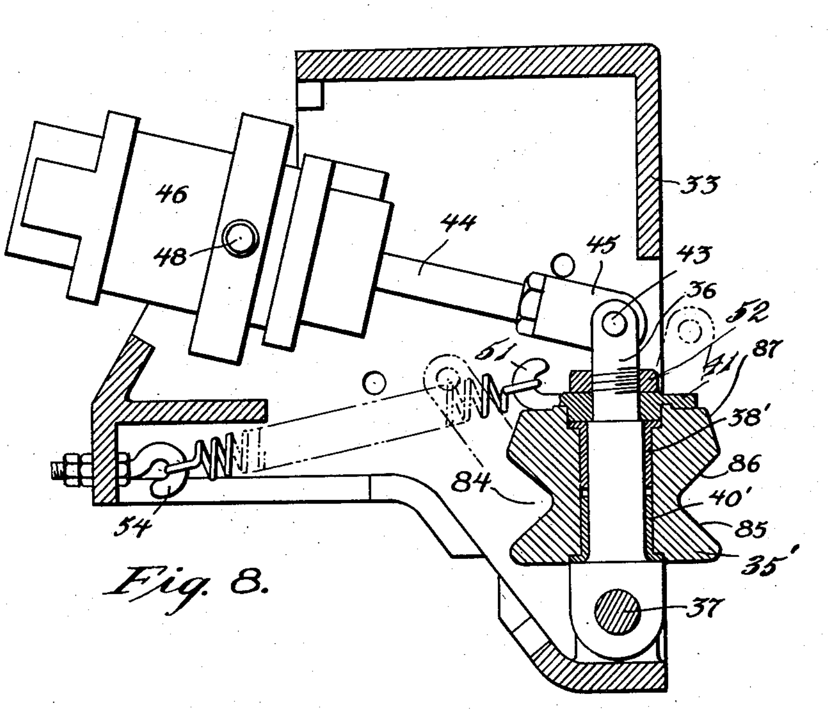
Figure 8 is a view corresponding to Figure 3 showing a special upper manipulator for squares which is adapted to turn sections having a greater relative length with respect to the cross section.
Figures 10, 11:
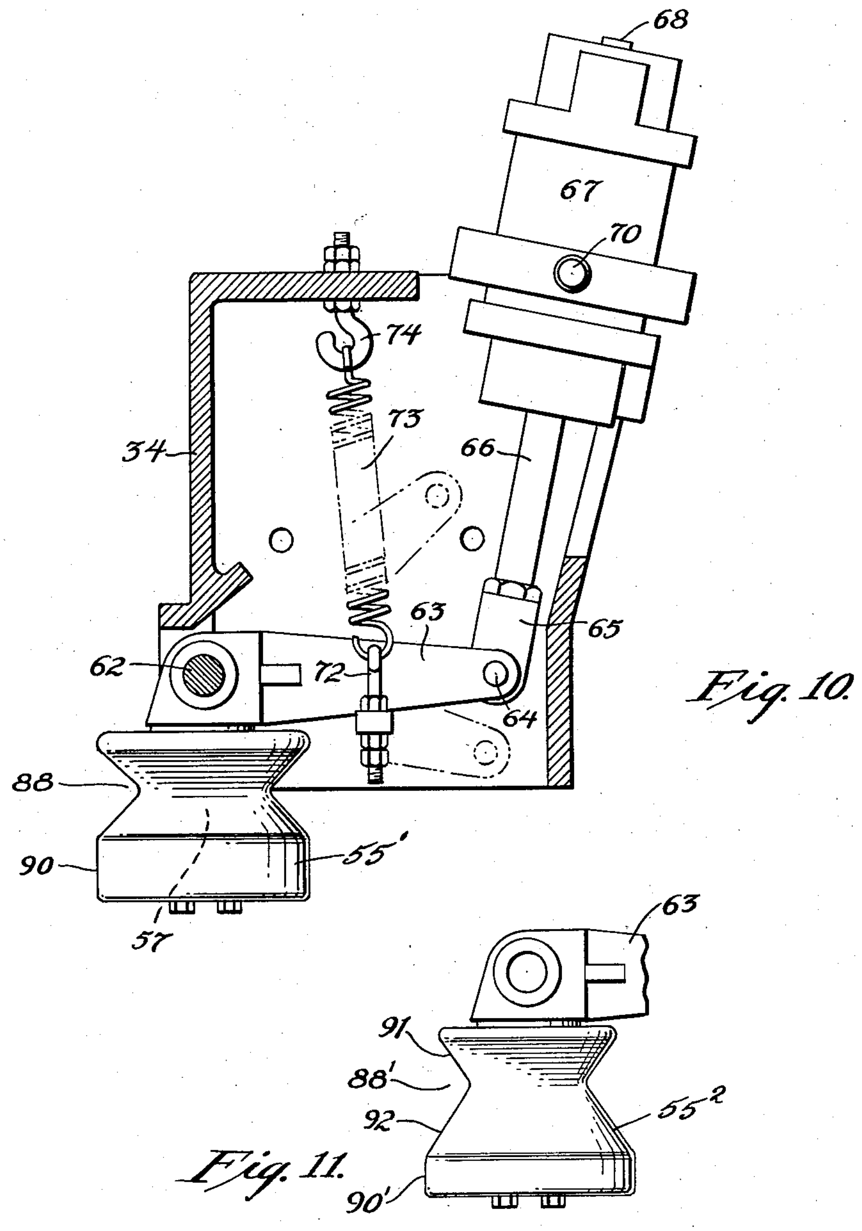
Figure 10 is a view corresponding to Figure 5 but showing a modification in the construction of the lower manipulator roller especially intended for turning squares having relatively great length with respect to the cross section.
Figure 11 is a fragmentary elevation according to Figure 10 but showing a modification in the lower manipulator roller for use upon diamonds having relatively great length with respect to the cross section.

It will of course be evident as explained in my said patent that different pressures may be applied to the different cylinders to compensate for the different loads which are applied during turning the stock.

Where the stock is of relatively great length compared to its cross section, it is not possible to turn it reliably using rollers of the construction of Figure 7. In this case improved results from the standpoint of reliability in turning action and also from the standpoint of avoidance of damage to the stock are obtained when turning squares having a great length with respect to the cross section by using an upper manipulator roller 35' as shown in Figure 8 and a lower manipulator roller 55' as shown in Figure 10. In this form, the bearings 38' and 40' have been somewhat simplified as shown in Figure 8, and the roll has a deep annular recess 84 whose sides 85 and 86 are suitably at right angles and approximate in length the sides of the square. This recess is placed well down on the manipulator roller and a reverse taper 87 is provided at the upper part, this upper portion assisting in turning if the stock tends to rise, but due to the reverse taper avoiding interference with the opposed manipulator roller in the inclined position. The reverse taper is preferably at an angle with respect to the roll axis of between 10 and 20 degrees, most desirably about 15 degrees.

On the lower manipulator roller, there is an annular V recess 88 near the top which is desirably of the same configuration of the V recess on the upper roll. Below the annular recess portion there is a cylindrical portion 90 which assists in turning the stock.

Figure 9:
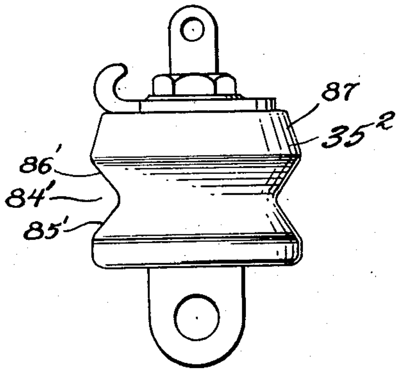
Figure 9 is a detailed side elevation of an upper manipulator roller and arm according to Figure 8 but modified for special use in turning diamonds having relatively great length with respect to the cross section.

In the case of diamonds which are of great length with respect to the cross sections, the upper roller $35^2$ of Figure 9 is used in the assembly of Figure 8 and the lower roller $55^2$ of Figure 11 is used in the assembly of Figure 10. The upper roller in this case has an annular recess 84' with side faces 85' and 86' conforming to the sides of the diamond cross section and having an angle between the faces which in this instance will not be a right angle but somewhat more to conform with the diamond angle, suitably of the order of 100 to 120 degrees.

On the other hand, on the lower diamond manipulator roller as shown in Figure 11, annular recess 88' has an upper side 91 which conforms to one diamond face and a lower side 92 which conforms to the other adjoining diamond face. The side 92 is longer than the other diamond face, the taper being extended so that the roller will not protrude in front of the side guard in retracted position. The angle between the sides 91 and 92 conforms to the angle of the sides of the diamond. The cylindrical lower portion 90' in this case is shortened, so that it will remain below the top of the table roller.

The rollers of Figures 8 and 10 are applied on squares and the rollers of Figures 9 and 11 are applied on diamonds in the same manner that the form of Figures 1 to 7 is used as far as the operator is concerned, the operator applying the air to the cylinders and forcing the side guards toward one another against the inclined surfaces of the rollers and turning the stock automatically in the manner already described.

Figure 12:
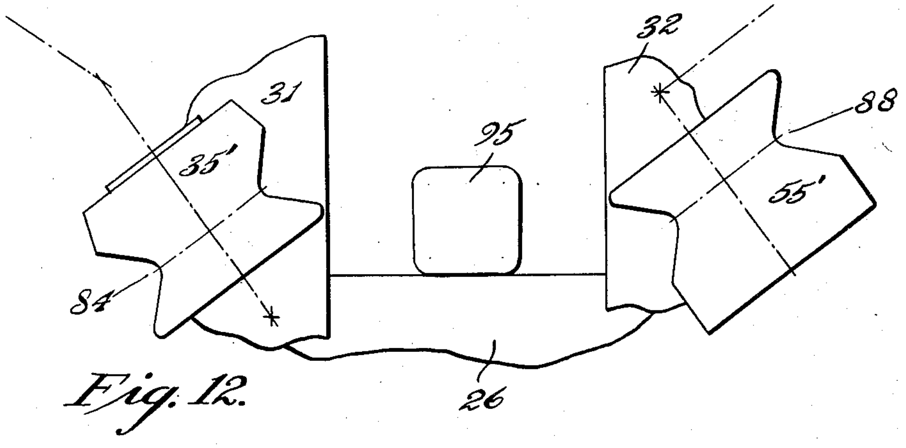
Figures 12 to 14 are diagrammatic end elevations showing operation of the square manipulator of Figures 8 and 10, and Figures 15 to 17 are similar views showing the operation of the diamond manipulator of Figures 9 and 11.
Figure 14:
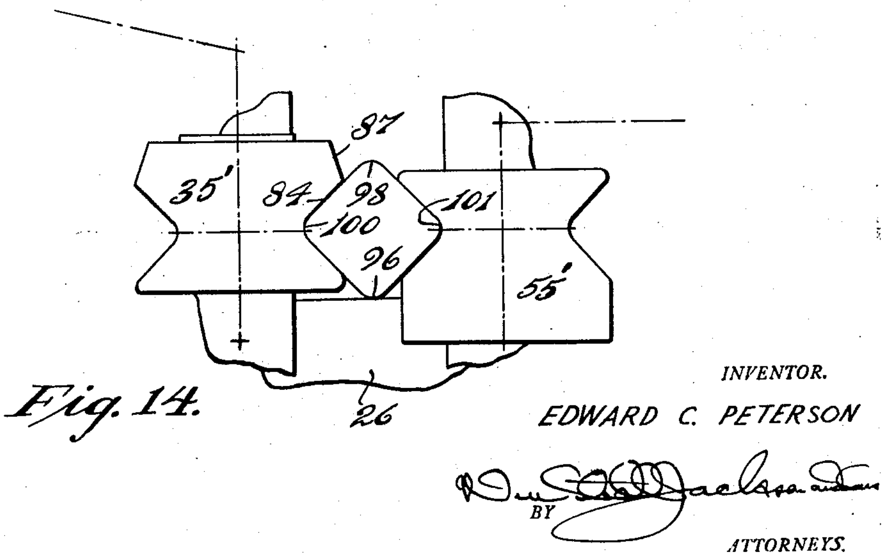
Figure 17:
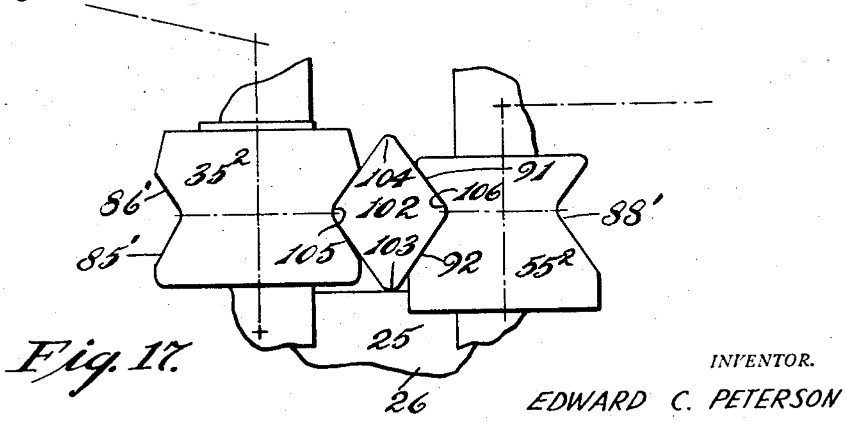

The operation of the device will be better understood by reference to Figures 12 and 14 for the square manipulator and Figures 15 to 17 for the diamond manipulator.

Figure 13:
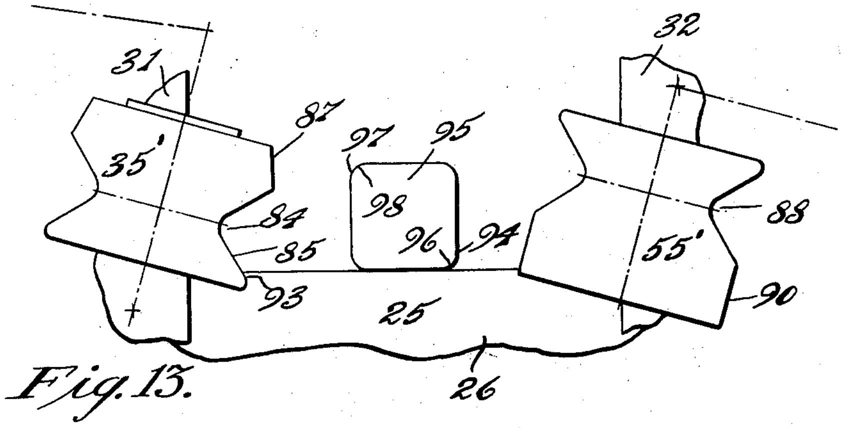

Considering first Figures 12 to 14, the manipulator rollers in inactive position are shown in Figure 12, roller 55' at the right being deflected behind the side guard 32 and roller 35' at the left being deflected behind the side guard 31.

In operative position shown in Figure 13, the respective rollers have advanced in front of the side guards and their axes are parallel and inclined to the vertical about 15 degrees as shown. In this position roller 55' has its cylindrical skirt portion 90 extending above the level of the table roller at the inside, while roller 35' has a portion 93 near the lower end of groove side 85 at the level of the table roller. Cone surface 87 is approximately parallel to the adjoining side of the stock.

As the rollers approach the stock, lower roller 55' first engages on cylindrical surface 90, tending to deflect the roller toward a vertical axis position and correspondingly tending to engage the side portion 94 of the stock 95 and force corner 96 down. At the same time cone surface 87 engages the side of the stock at 97 near corner 98, tending to force corner 98 up and bring the axis of roller 35' vertical. The result as shown in Figure 14 is to force corner 96 down and corner 98 up and to seat corner 100 in the groove of roller 35' and corner 101 in the groove of roller 55'.

In operation of the diamond manipulator, Figure 15 shows roller $55^2$ retracted behind side guard 32 and roller $35^2$ retracted behind side guard 31.

In operative position the respective rollers are brought forward of the respective side guards as shown in Figure 16, the axis of roller $55^2$ being vertical, and the axis of roller $35^2$ being inclined about 15 or 20 degrees to the vertical.

As the rollers come together and engage the diamond stock 102, cylindrical skirt 90' of roller $55^2$ is at the level of the table roller 25, and it first engages corner 103 of the diamond tending to force it down. At the same time conical surface 87 on roller $35^2$ engages opposite corner 104 of the diamond tending to force it up. As a result, corner 105 is received into the recess of roller $35^2$ in engagement with conical surfaces 85' and 86'. Corner 106 is received into the recess of roller $55^2$ to engage respective conical roller surfaces 91 and 92.

As the mill picks up the stock for the next pass the stock passes longitudinally through the manipulator rollers, the rollers rotating at that time.

In view of my invention and disclosure variations and modifications to meet individual whim or particular need will doubtless become evident to others skilled in the art, to otbain all or part of the benefits of my invention without copying the structure shown, and I, therefore, claim all such insofar as they fall within the reasonable spirit and scope of my claims.

Having thus described my invention what I claim as new and desire to secure by Letters Patent is:

An auxiliary manipulator for a rolling mill adapted to turn four-parallel sided stock having its bottom initially resting on a rolling mill table, said manipulator comprising a pair of opposed mill table elements movable toward and away from each other laterally of said table, arms individually corresponding to said mill table elements and having pivots on the same, the axes of said pivots being horizontal and longitudinal of said mill table, one of said arms extending downwardly from its corresponding pivot and the other of said arms extending upwardly from its corresponding pivot, cylindrical manipulator rollers of substantial axial extent journaled on the ends of said arms respectively on axes longitudinal of said arms, means for moving said pivoted arms and their rollers toward each other, one of said rollers contacting a lower corner of said stock by rotation of the corresponding arm on the pivot of that arm and the other of said rollers contacting the diagonally opposite upper corner of said stock by rotation of the corresponding arm on the pivot of that arm so that the cylindrical faces of said rollers extend from said corners obliquely outside the opposite sides of said stock respectively, said one of said cylindrical rollers having an annular narrow hooking groove around its cylindrical face adjacent the bottom thereof, said notch receiving the corresponding corner of said stock and restraining that corner against sliding axially of the notched roller throughout the time said stock is being turned axially of itself, the turning being promoted by further movement of said rollers and pivoted arms toward each other by said means and continuing until said roller axes are parallel to said opposite side faces of the stock and said side faces are flatly in contact with the corresponding cylindrical roller faces.

References Cited in the file of this patent

UNITED STATES PATENTS

| | | |
|---|---|---|
| 2,649,003 | Peterson | Aug. 18, 1953 |
| 2,664,215 | Bottenhorn | Dec. 29, 1953 |

FOREIGN PATENTS

| | | |
|---|---|---|
| 778,394 | France | Mar. 15, 1935 |